(12) United States Patent
Colbourne

(10) Patent No.: US 11,909,437 B2
(45) Date of Patent: Feb. 20, 2024

(54) OPTIC FOR MULTI-PASS OPTICAL CHANNEL MONITOR

(71) Applicant: Lumentum Operations LLC, San Jose, CA (US)

(72) Inventor: Paul Colbourne, Ottawa (CA)

(73) Assignee: Lumentum Operations LLC, San Jose, CA (US)

( * ) Notice: Subject to any disclaimer, the term of this patent is extended or adjusted under 35 U.S.C. 154(b) by 395 days.

(21) Appl. No.: 17/301,260

(22) Filed: Mar. 30, 2021

(65) Prior Publication Data

US 2022/0209864 A1 Jun. 30, 2022

Related U.S. Application Data

(60) Provisional application No. 63/131,181, filed on Dec. 28, 2020.

(51) Int. Cl.
| | | |
|---|---|---|
| *H04B 10/079* | (2013.01) | |
| *G01J 3/14* | (2006.01) | |
| *G01J 3/18* | (2006.01) | |
| *G01J 3/02* | (2006.01) | |
| *G01J 3/12* | (2006.01) | |

(52) U.S. Cl.
CPC ........ *H04B 10/07957* (2013.01); *G01J 3/021* (2013.01); *G01J 3/14* (2013.01); *G01J 3/18* (2013.01); *G01J 2003/1208* (2013.01)

(58) Field of Classification Search
CPC ...... H04B 10/07957; G01J 3/021; G01J 3/14; G01J 3/18
See application file for complete search history.

(56) References Cited

U.S. PATENT DOCUMENTS

| | | | | |
|---|---|---|---|---|
| 3,729,261 | A * | 4/1973 | Sandercock | G01J 3/26 356/454 |
| 6,285,423 | B1 * | 9/2001 | Li | G02B 6/0056 349/63 |
| 2003/0137661 | A1 * | 7/2003 | Ortyn | G01N 21/85 356/338 |
| 2005/0094934 | A1 * | 5/2005 | He | G02B 5/3025 385/24 |
| 2013/0050697 | A1 * | 2/2013 | Colbourne | G01J 3/027 359/615 |

* cited by examiner

*Primary Examiner* — Nathan M Cors
(74) *Attorney, Agent, or Firm* — Harrity & Harrity, LLP

(57) ABSTRACT

An optical device may include a dispersion element. The optical device may include a reflective optic to reflect an optical beam with a fixed offset perpendicular to a dispersion direction of the dispersion element and with a negative offset in the dispersion direction of the dispersion element. The reflective optic may be aligned to the dispersion element to offset an optical beam with respect to the dispersion element and to cause the optical beam to pass through the dispersion element on a plurality of passes, offsetting the optical beam on each of the plurality of passes.

20 Claims, 7 Drawing Sheets

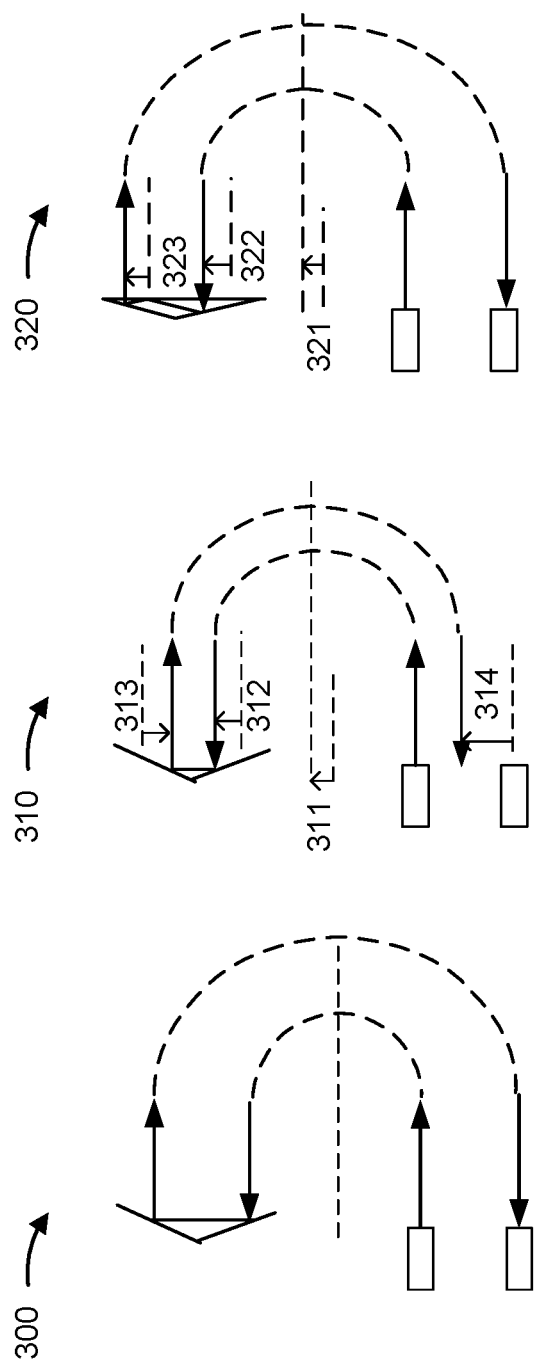

OPTIC FOR MULTI-PASS OPTICAL CHANNEL MONITOR

CROSS-REFERENCE TO RELATED APPLICATION

This patent application claims priority to U.S. Provisional Patent Application No. 63/131,181, filed on Dec. 28, 2020, and entitled "MULTI-PASS HIGH RESOLUTION SPECTROMETER." The disclosure of the prior application is considered part of and is incorporated by reference into this patent application.

TECHNICAL FIELD

The present disclosure relates generally to a reflective optic and to an optical device that includes a reflective optic aligned to a dispersion element and a microelectromechanical system (MEMS) element to cause an optical beam to pass through the dispersion element and the MEMS element on a plurality of passes with the optical beam having a fixed perpendicular offset applied in a dispersion direction of the dispersion element and a spectral inversion applied on each of the plurality of passes.

BACKGROUND

An optical channel monitor (OCM) is a device capable of measuring an optical power in a wavelength channel of an optical signal. An OCM can be connected to a point in an optical network in order to measure, for example, power, frequency, and other characteristics of an optical channel at that point. In some cases, an OCM may scan multiple wavelength channels in order to measure optical power in the multiple channels (e.g., across a range of wavelengths). For example, an OCM may be used to monitor channels in a wavelength division multiplexed (WDM) system in which wavelength channels are multiplexed into a common carrier signal for transmission across the optical network (e.g., a dense wavelength division multiplexed (DWDM) system in which wavelength channels are spaced apart by a frequency of 50 gigahertz (GHz), among other examples).

SUMMARY

According to some implementations, an optical device may include a dispersion element. The optical device may include a reflective optic to reflect an optical beam with a fixed offset perpendicular to a dispersion direction of the dispersion element and with a negative offset in the dispersion direction of the dispersion element. The reflective optic may be aligned to the dispersion element to offset an optical beam with respect to the dispersion element and to cause the optical beam to pass through the dispersion element on a plurality of passes, offsetting the optical beam on each of the plurality of passes.

According to some implementations, a method may include receiving, at an input port of an optical channel monitor, an optical beam. The method may include directing, by a reflective optic of the optical channel monitor, the optical beam through a dispersion element of the optical channel monitor for a plurality of passes, wherein each pass is offset in accordance with a fixed perpendicular offset of the reflective optic. The method may include determining, by the optical channel monitor, a characteristic of the optical beam based on directing the optical beam through the dispersion element for the plurality of passes.

According to some implementations, a reflective optic may include a plurality of prism faces. The plurality of prism faces may be angled with respect to each other to cause, in an optical path, a fixed perpendicular offset in at least one optical path through the reflective optic with respect to at least one other optical path through the reflective optic. The plurality of prism faces may be angled with respect to each other to cause, in the at least one optical path, a spectral inversion.

BRIEF DESCRIPTION OF THE DRAWINGS

FIGS. 3A-3C are diagrams of example optical paths described herein.

DETAILED DESCRIPTION

Figure 1A:
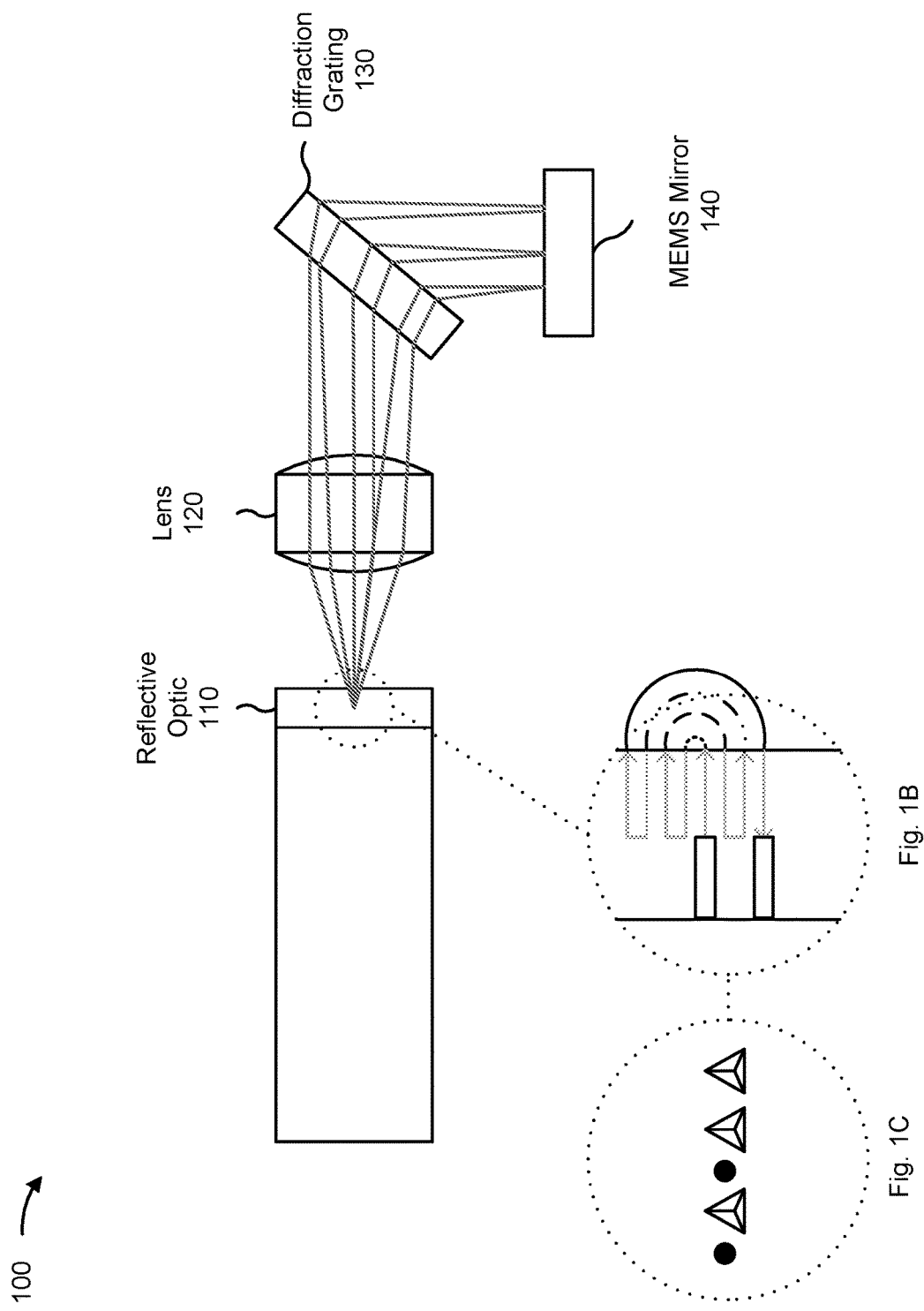
FIGS. 1A-1C are diagrams of an example optical device described herein.

The following detailed description of example implementations refers to the accompanying drawings. The same reference numbers in different drawings may identify the same or similar elements.

As described above, an optical channel monitor (OCM) or a spectrometer may be used to measure a characteristic of an optical beam. A spectral resolution of an OCM may be expressed in terms of a frequency width, $\Delta F$, of a spectral shape of a single measured frequency, such as when measuring a laser. A narrower measured frequency corresponds to a higher spectral resolution. The spectral resolution may be defined in terms of a measured frequency (F) as $F/\Delta F$. A traditional OCM may be deployed to cover the C-band of approximately 191 terahertz (THz) to 196 THz, which may result in a desired spectral range of approximately 5000 gigahertz (GHz). Given a frequency width, for a traditional OCM, of approximately 20 GHz, a traditional OCM may resolve approximately 250 different frequencies in the covered C-band.

Accordingly, a tuning element, which may be a microelectromechanical system (MEMS) element, such as a MEMS mirror, of the OCM will have a size and tilt angle selected to resolve 250 different beam positions. To achieve this range for the tuning element, a product of a mirror size and tilt angle is to be greater than $250\lambda/2$, where $\lambda$ is a wavelength of light in the C-band. For a mirror size of, for example, 1000 micrometers ($\mu m$) and a wavelength of 1.55 $\mu m$ (approximately 193 THz at a center of the C-band), a resulting tilt angle is at least 11 degrees (or +/−5.5 degrees for a mirror that can tilt to both positive and negative angles). For an OCM covering a larger band, such as an OCM covering both the C-band (191 THz to 196 THz) and the L-band (184 THz to 191 THz), an even larger tilt angle and/or mirror size may be required for a tuning element. Increased tilt angles and larger mirrors may result in manufacturing difficulties. Moreover, as communication densities increase, miniaturization may prevent deployment of optical devices with relatively larger mirrors or relatively large components for achieving increased tilt angles. Accordingly, it may be desirable for optical devices to achieve high spectral resolution with smaller form factors.

Some implementations described herein enable an OCM or spectrometer with a compact form factor and a high spectral resolution. For example, an optical device may include a reflecting element to reflect an optical beam through a diffraction element and a MEMS mirror on multiple passes with each pass separated by an offset. By reflecting the optical beam through the diffraction element and MEMS mirror on multiple passes, the optical device achieves increased spectral resolution without an accompanying increase in a size of a reflecting element and/or an accompanying increase in a tilt angle achievable by the reflecting element. Similarly, a given spectral resolution may be achieved using a reduced size reflecting element and/or with a reflecting element with a reduced achievable tilt angle. Similarly, a frequency range at a given spectral resolution or a given size may be increased by using multiple passes, as described herein. The optical device may reflect the optical beam with a spectral inversion and a fixed offset perpendicular to a dispersion direction of the dispersion element, thereby enabling a separation between output light and input light in the optical device. As a result, the optical device enables achievement of the increased spectral resolution or reduced form factor, among other examples.

Figure 1B:
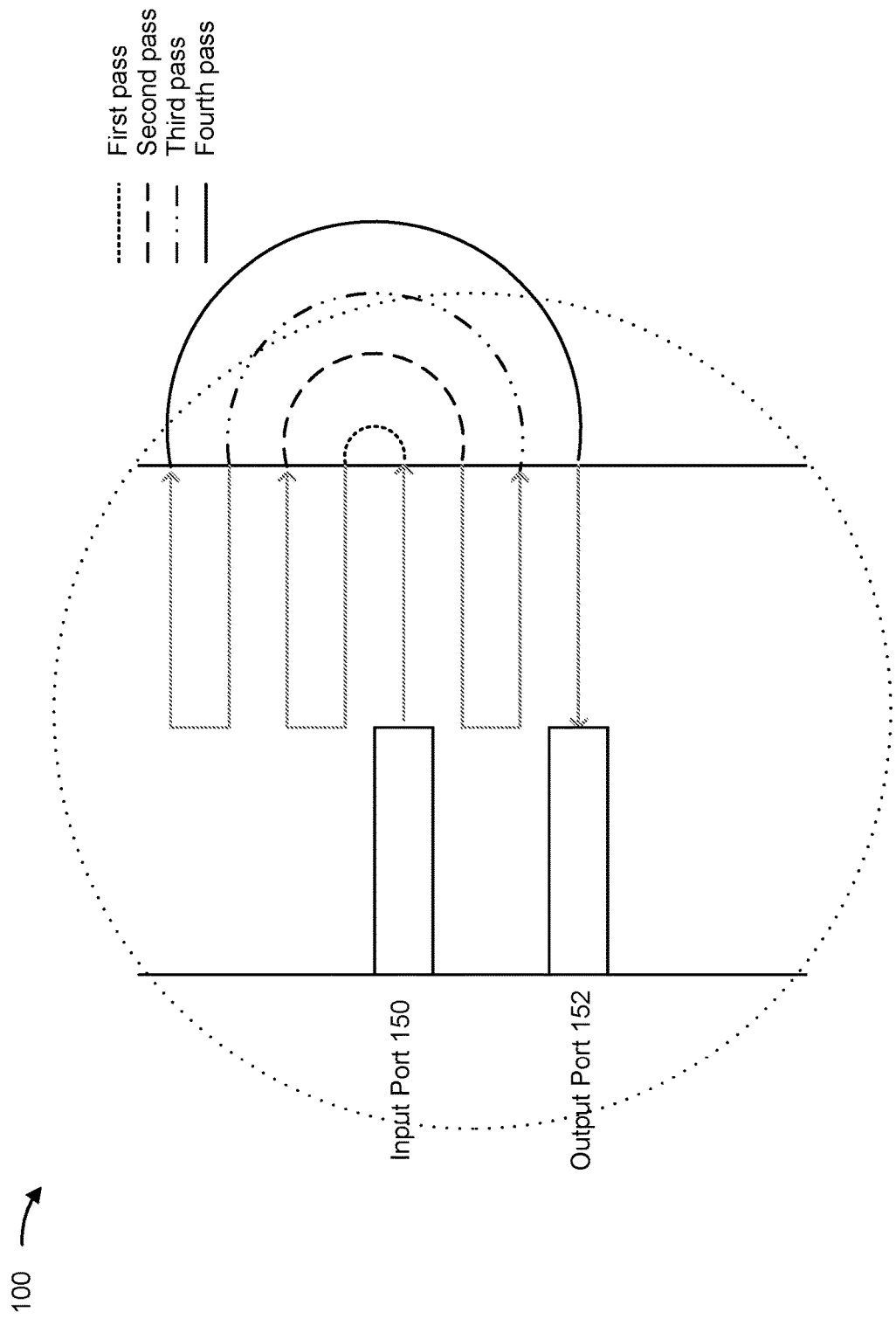
Figure 1C:
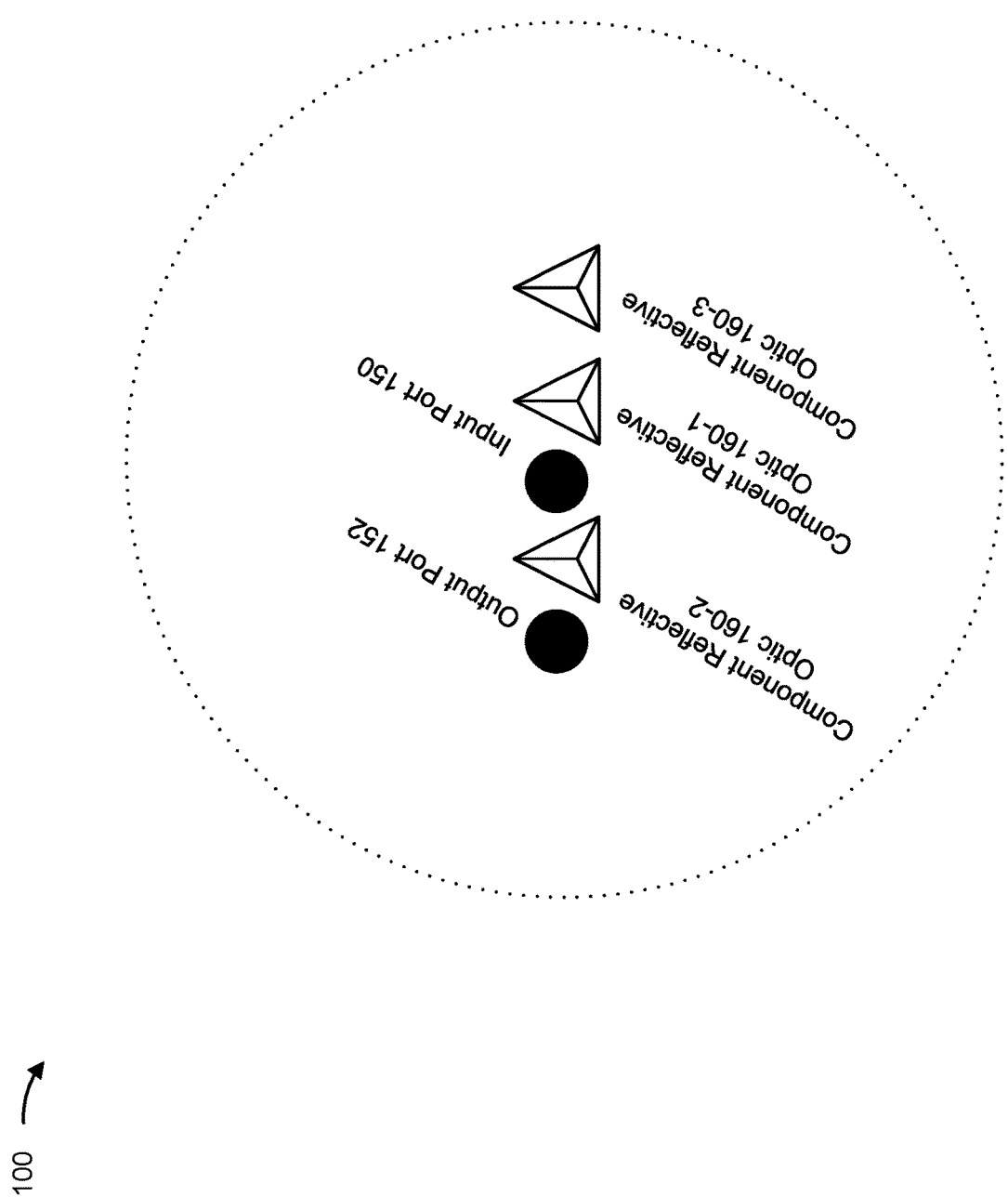

FIGS. 1A-1C are diagrams of an example optical device 100. As shown in FIG. 1A, example optical device 100 includes a reflective optic 110, a lens 120, a diffraction grating 130, and a MEMS mirror 140.

Reflective optic 110 may include one or more components to reflect an optical beam through diffraction grating 130 and MEMS mirror 140. For example, reflective optic 110 may include a reflector array (e.g., a retroreflector array), a corner cube reflector or retroreflector, a prism (e.g., with reflective surfaces), a retroreflective prism, a set of retroreflective prisms, a refractor (e.g., a prism with refractive surfaces), a refractor array, or a mirror, among other examples. Reflective optic 110 may receive an incident optical beam, in a first pass, and reflect the incident optical beam with a lateral offset of the reflected optical beam and an inversion of a spectrum of the optical beam. In some implementations, the lateral offset may be a fixed perpendicular offset. For example, reflective optic 110 may reflect the incident beam on multiple passes such that the reflective optic causes the incident beam to offset by a fixed amount in a direction perpendicular to a dispersion direction of diffraction grating 130. In this way, output light (with respect to reflective optic 110) can be separated from input light (with respect to reflective optic 110). In some implementations, the spectral invention may be a negative offset of the optical beam applied on each reflection of the reflective optic 110 corresponding to each pass through diffraction grating 130 and MEMS mirror 140. In this way, light on different passes avoids being re-collapsed to a single point when passing through diffraction grating 130 (e.g., as may occur in a wavelength selective switch where a spectral inversion does not occur between an optical beam on different optical paths through a diffraction grating). Moreover, in this way, reflective optic 110 doubles dispersion with each pass, thereby increasing spectral resolution and/or achieving miniaturization for a given level of spectral resolution by obviating a need for inclusion of multiple beam expander optics to achieve a similar level of dispersion.

Lens 120 may be an optical element configured to align reflective optic 110 with diffraction grating 130 and MEMS mirror 140. For example, lens 120 may be a collimating lens, among other examples. In some implementations, reflective optic 110 and lens 120 may form a single monolithic assembly that is collectively aligned with diffraction grating 130 and MEMS mirror 140. In some implementations, optical device 100 may include another type of optic to align reflective optic 110 to diffraction grating 130 and MEMS mirror 140. For example, optical device 100 may include a mirror to reflect an optical beam between reflective optic 110 and diffraction grating 130 rather than lens 120. Additionally, or alternatively, optical device 100 may include a combination of optics, such as lens 120 and one or more additional optical elements, to align reflective optic 110 to diffraction grating 130.

Diffraction grating 130 is an example of a dispersion element included in optical device 100. For example, diffraction grating 130 may split and diffract an optical beam into multiple component optical beams to enable a measurement of one or more optical characteristics of each component beam. In some implementations, optical device 100 may include a different type of dispersion element. For example, optical device 100 may include a prism or a mirror acting as a dispersion element aligned to reflective optic 110 and MEMS mirror 140 to enable measurement of an optical beam. Diffraction grating 130 may achieve a smaller size, at a particular spectral resolution, than other diffraction gratings based on being aligned to reflective optic 110 to receive multiple passes of an optical beam. Spectral resolution of a diffraction grating may be based on a quantity of grating lines illuminated, N, and a diffraction order, m, such that $F/\Delta F = \pi m N$. As a result, an optical beam that is reduced in size by, for example, 4 times would result in a reduction in spectral resolution of, in this example, 4 times. However, by passing the optical beam through the diffraction grating 4 times on 4 passes using reflective optic 110, diffraction grating 130 may achieve the same spectral resolution as another diffractive optic that is 4 times the size of diffraction grating 130.

MEMS mirror 140 is an example of a tuning element in optical device 100. For example, MEMS mirror 140 may include a set of tilting mirrors to reflect component optical beams of an optical beam (e.g., different channels of an optical beam) at different angles to achieve measurement of the component optical beams. In some implementations, optical device 100 may include a different type of tuning element to achieve reflection of the component optical beams. In some implementations, MEMS mirror 140 may be aligned to diffraction grating 130 without intervening beam expander/compressor optics (or with reduced beam expander optics relative to other OCMs). For example, based on reducing a size of the optical beam through diffraction grating 130 (and compensating by passing the optical beam through multiple times to maintain spectral resolution, as described above), the optical beam can directly impinge on MEMS mirror 140 without intervening beam expander/compressor optics. In some implementations, diffraction grating 130 may be disposed directly on a surface of MEMs mirror 140. For example, diffraction grating 130 may be manufactured on a surface of MEMS mirror 140 forming a single integrated component. In this way, use of multiple passes and reflective optic 110 reduces a quantity of optics in optical device 100, thereby reducing size, cost, and complexity and improving durability relative to other optical devices. In some cases, a quantity of passes through optical device 100 may be based on a size of MEMS mirror 140. For example, optical device 100 may be configured with a particular quantity of passes to ensure a particular level of spectral resolution while maintaining a beam size less than a threshold. In this case, the threshold is based on the size of MEMS mirror 140 (e.g., the threshold is a size that enables direct impingement without beam expander/compressor optics or with fewer than a threshold quantity or less than a threshold size beam expander/compressor optics).

As shown in FIG. 1B, reflective optic 110 may include an input port 150 to receive an optical beam for multiple passes through diffraction grating 130 and MEMS mirror 140 and an output port 152 to output the optical beam after the multiple passes through diffraction grating 130 and MEMS mirror 140. For example, reflective optic 110 may direct (via lens 120, as described above) the optical beam toward diffraction grating 130 and MEMS mirror 140 for a first pass and receive a reflection of the optical beam at an end of the first pass. Subsequently, reflective optic 110 may direct the optical beam (e.g., after internal reflection of the optical beam as described herein with regard to FIG. 2A) back toward diffraction grating 130 and MEMS mirror 140 (e.g., via lens 120) for one or more additional passes through diffraction grating 130 and MEMS mirror 140 (e.g., a second pass, a third pass, a fourth pass). In this example, after a fourth pass through diffraction grating 130 and MEMS mirror 140, reflective optic 110 may direct the optical beam to output port 152 for output. In some implementations, optical device 100 may include a different configuration. For example, rather than input port 150 and/or output port 152 being included in reflective optic 110, optical device 100 may include an input port and/or an output port separate from reflective optic 110. In this case, lens 120, diffraction grating 130, and/or MEMS mirror 140 may be configured to receive the optical beam from and/or direct the optical beam to an input port and/or an output port, respectively, without reflective optic 110.

As shown in FIG. 1C, reflective optic 110 may include a set of component reflective optics 160 to enable the multiple passes of the optical beam through diffraction grating 130 and MEMS mirror 140. For example, after a first pass (e.g., from input port 150 through lens 120, diffraction grating 130, and MEMS mirror 140 and then back through diffraction grating 130 and lens 120), reflective optic 110 may receive the optical beam at a first component reflective optic 160-1. In this case, first component reflective optic 160-1 may cause a spectral inversion and a fixed perpendicular offset of the optical beam, and direct the optical beam toward diffraction grating 130 and MEMS mirror 140 (e.g., via lens 120) for a second pass. Similarly, after the second pass, component reflective optic 160-2 may reflect the optical beam for a third pass and, after the third pass, component reflective optic 160-3 may reflect the optical beam for a fourth pass. In this case, after the fourth pass, the optical beam is incident on output port 152 for output. In some implementations, each component reflective optic 160 is a discrete optical element. For example, reflective optic 110 may include a plurality of discrete prisms forming component reflective optics 160. Additionally, or alternatively, a single optical element may form a plurality of component reflective optics 160. For example, a single prism may include a plurality of possible paths through the single prism and, for example, a first path may form a first component reflective optic and a second path may form a second component reflective optic. Although some implementations are described in terms of a particular quantity of passes, quantity of component reflective optics 160, or arrangement of component reflective optics 160 and ports, other implementations are contemplated, with other quantities of passes, quantities of component reflective optics 160, or arrangements of component reflective optics 160 and ports.

As indicated above, FIGS. 1A-1C are provided as an example. Other examples may differ from what is described with regard to FIGS. 1A-1C.

Figure 2A:
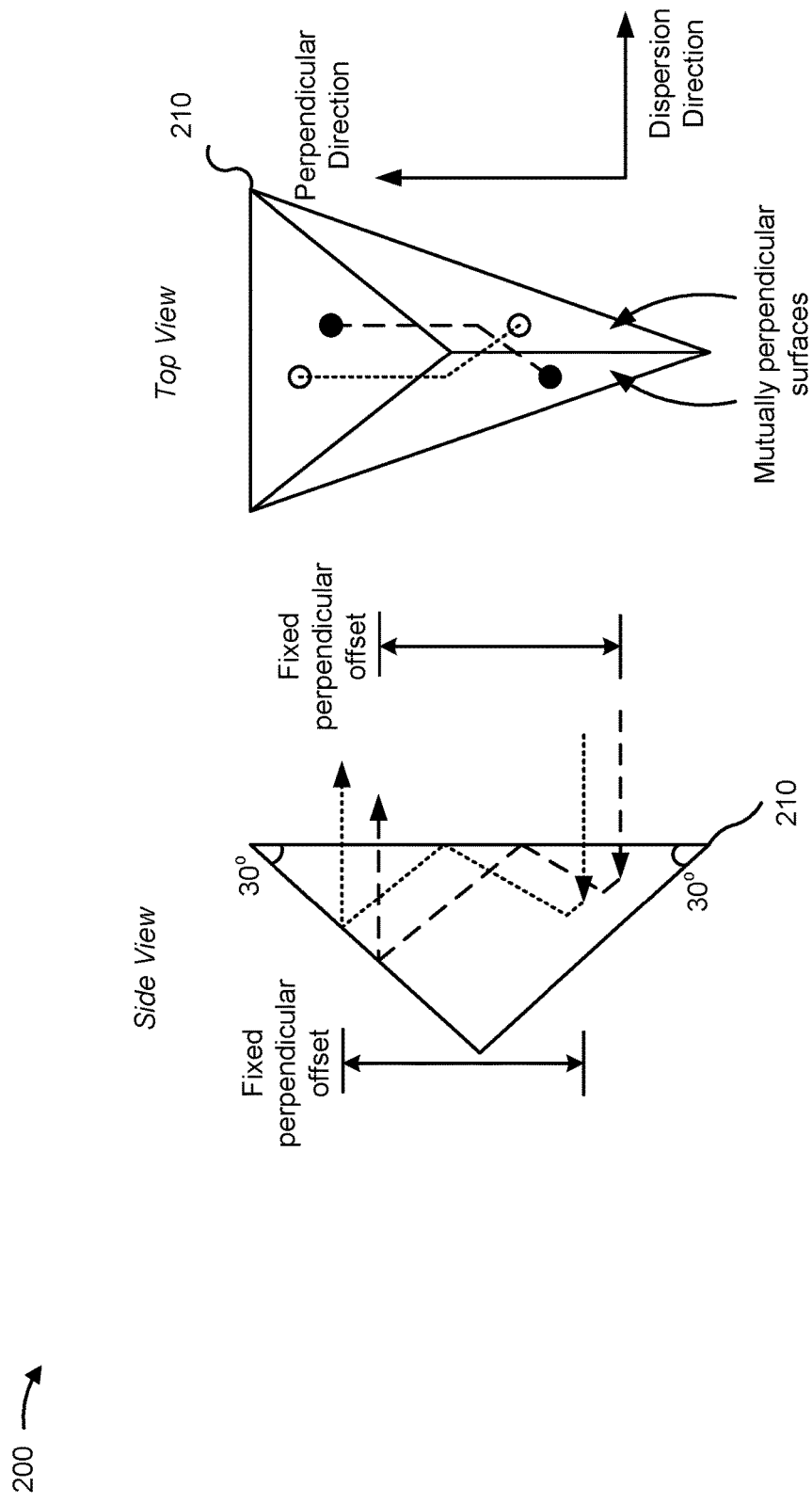
FIGS. 2A and 2B are diagrams of example optics described herein.
Figure 2B:
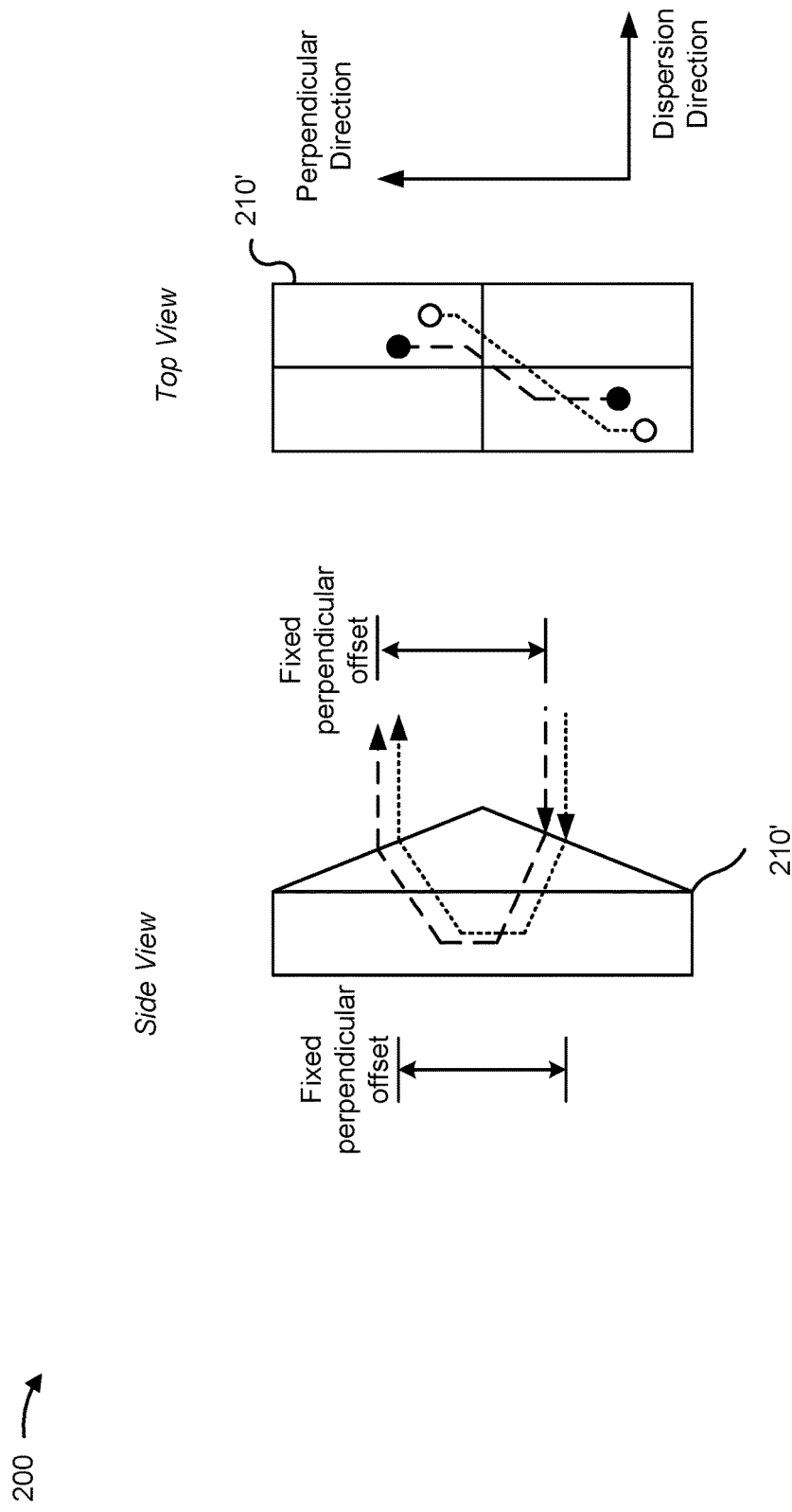

FIGS. 2A and 2B are diagrams of example implementations 200/200' of an optic, such as reflective optic 110 and/or a component reflective optic 160 thereof.

As shown in FIG. 2A, a set of rays may be incident on a surface of a reflector 210 configured to reflect optical beams in an optical device, such as optical device 100. In some implementations, reflector 210 may be a prism manufactured from a glass material, a plastic material, or a semiconductor material, among other examples. In some implementations, reflector 210 may be similar to a corner cube reflector, but with prism face angles selected to cause an additional total internal reflection on a front face of reflector 210, thereby achieving a fixed separation in a perpendicular direction, as described in more detail below. For example, reflector 210 is configured to cause internal reflection of the set of rays, such that an output ray position has a fixed offset, in a direction perpendicular to a dispersion direction of a dispersion element (e.g., in the perpendicular direction), from an input ray position. In other words, reflector 210 has a set of prism faces angled (e.g., at 30 degrees)(30° (and two of the prism faces that are mutually perpendicular, as shown)) to cause a first input ray to be incident at a first position and output from a second position on a surface of reflector 210, such that the first position and the second position are offset by a particular amount. Additionally, or alternatively, the set of prism faces may be angled to cause a second input ray to be incident at a third position and output from a fourth position, which are different from the first position and the second position, respectively, such that the third position and the fourth position are also separated by the particular amount. This is in contrast with other corner cube reflectors in which a separation between an incident position and an output position is based on a location of the incident position rather than being fixed. In some implementations, reflector 210 is configured to cause a spectral inversion with respect to the dispersion direction.

As shown in FIG. 2B, a set of rays may be incident on a surface of a refractor 210' configured to reflect optical beams in an optical device, such as optical device 100. In this case, refractor 210' is configured to cause a reflection of the set of rays, such that an output ray position has a fixed offset, in a direction perpendicular to a dispersion direction of a dispersion element (e.g., in the perpendicular direction), from an input ray position. In some implementations, refractor 210' may be formed from a prism with refractive surfaces that produce a perpendicular offset, as shown. In some implementations, a particular type or configuration of refractor 210' may be selected to minimize a chromatic aberration associated with refractive surfaces of refractor 210'. In some implementations, refractor 210' is configured to cause a spectral inversion with respect to the dispersion direction.

As indicated above, FIGS. 2A and 2B are provided as one or more examples. Other examples may differ from what is described with regard to FIGS. 2A and 2B.

FIGS. 3A-3C are diagrams of example optical paths. FIG. 3A and example 300 show a first set of optical paths (e.g., alignable to a set of positions on a dispersion element), in an optical device described herein, such as optical device 100, when a reflector described herein, such as reflective optic 110 or reflector 210, is aligned with a set of optical fibers. FIG. 3B and example 310 show a second set of optical paths when another type of reflector, which is not configured for a fixed perpendicular offset, is misaligned with the set of optical fibers. FIG. 3C and example 320 show a third set of optical paths when a reflector described herein, such as reflective optic 110 or reflector 210, is misaligned with the set of optical fibers. In FIG. 3B, an offset due to a rotation of a MEMS mirror in the perpendicular direction results in the optical axis being offset in a first direction at reference number 311. At reference number 312, an offset to the optical axis in the first direction causes an offset in the first direction in a location at which an optical beam enters the optical reflector. The optical reflector, having a single internal reflection, causes an offset in a second direction in a location at which the optical beam exits the optical reflector, at reference number 313. At reference number 314, the offset in the second direction causes an offset in the first direction of a location to which the optical beam is directed, thereby causing the optical beam to miss an output fiber. In this case, a reflector not configured for a fixed perpendicular offset, when misaligned with a set of optical fibers, causes an output beam to fail to reach an output fiber of the set of optical fibers. This is a result of having a perpendicular offset that is based on a location of the incident position, as described above with regard to FIGS. 2A and 2B. In contrast, a reflector configured for a fixed perpendicular offset, as shown in FIG. 3C and in example 320, when misaligned with a set of optical fibers, causes the output beam to continue to reach the output fiber of the set of optical fibers. For example, as shown by reference number 321, an offset due to a rotation of a MEMS mirror in the perpendicular direction results in the optical axis being offset in the first direction. At reference number 322, the offset to the optical axis in the first direction causes an offset in the first direction in a location at which an optical beam enters the optical reflector. The optical reflector, having a fixed perpendicular offset, causes an offset in the first direction in a location at which the optical beam exists the optical reflector, at reference number 323. This is a result of having a fixed perpendicular offset that is independent of the incident position, thereby resulting in the optical beam still reaching the output fiber.

In this way, using a reflective optic with a fixed perpendicular offset, such as reflective optic 110 or reflector 210, may reduce a likelihood of poor optical device performance resulting from poor alignment of components of the optical device. For example, ensuring that alignment of the optical paths to the output fiber is independent of alignment of the optical paths to the input fiber avoids a magnification affect that could occur when using multiple passes through an optical device. In other words, if a beam is reflected by an improperly aligned MEMS mirror (such as MEMS mirror 140) 4 times, then output beam offsets are multiplied by 4 times. This can increase power level errors by 16 times as a result of insertion loss. However, by using a reflective optic as in FIGS. 3A and 3C (and in FIG. 2A and a refractive optic in FIG. 2B), which has an additional internal reflection relative to a reflective optic in FIG. 3B, the alignment error is obviated, thereby enabling use of multiple passes and corresponding reflections by an improperly aligned MEMS mirror without magnifying an output beam offset and an accompanying power level error.

As indicated above, FIGS. 3A-3C are provided as an example. Other examples may differ from what is described with regard to FIGS. 3A-3C.

Figure 4:
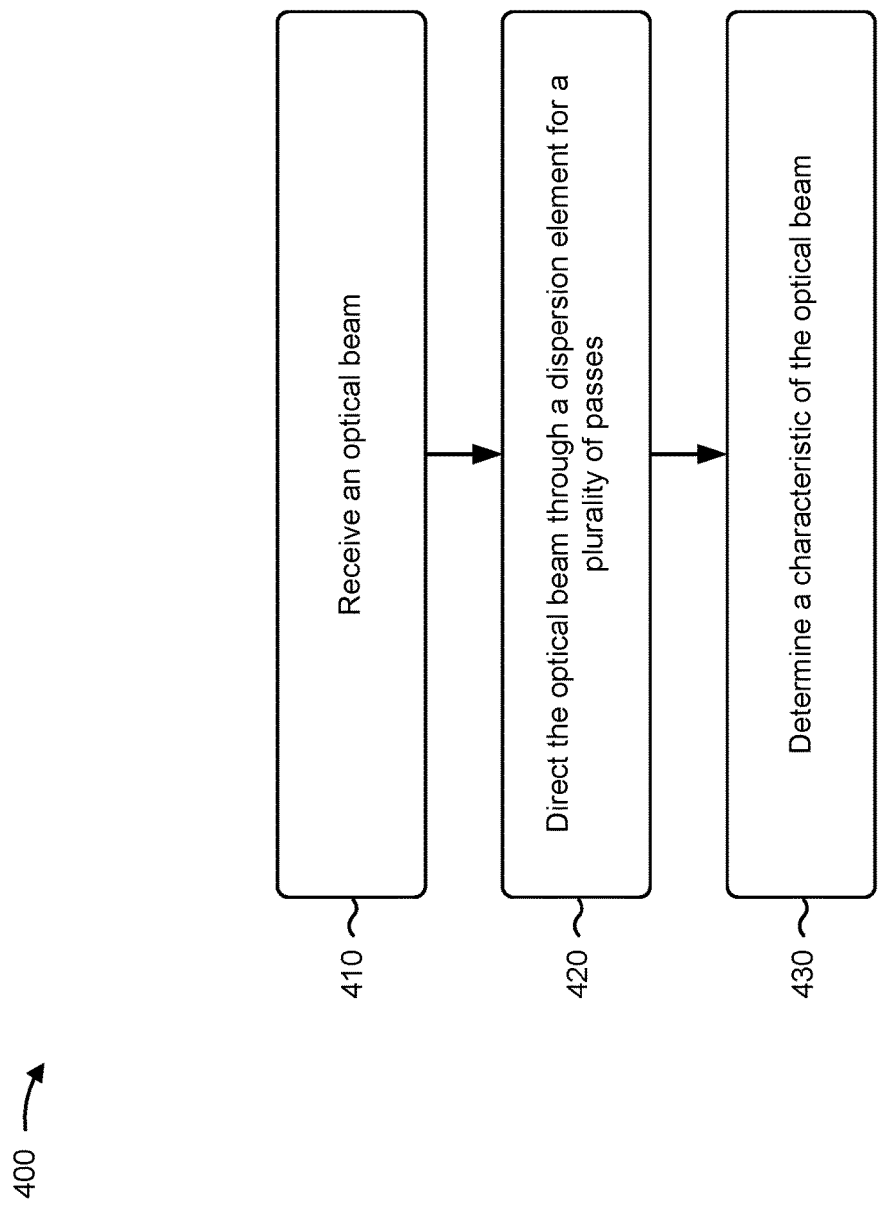
FIG. 4 is a flowchart of an example process relating to directing an optical beam through an optical device described herein.

FIG. 4 is a flowchart of an example process 400 associated with optic for multi-pass optical channel monitor. In some implementations, one or more process blocks of FIG. 4 may be performed by an optical device or components thereof (e.g., optical device 100 or components thereof, reflector 210, the reflector of FIGS. 3A and 3C, among other examples). In some implementations, one or more process blocks of FIG. 4 may be performed by another device or a group of devices separate from or including the optical device.

As shown in FIG. 4, process 400 may include receiving, at an input port of an optical channel monitor, an optical beam (block 410). For example, the optical device may receive, at an input port of an optical channel monitor, an optical beam, as described above.

As further shown in FIG. 4, process 400 may include directing the optical beam through a dispersion element of the optical channel monitor for a plurality of passes, wherein each pass is offset in accordance with a fixed perpendicular offset of the reflective optic (block 420). For example, the optical device may direct the optical beam through a dispersion element of the optical channel monitor for a plurality of passes, wherein each pass is offset in accordance with a fixed perpendicular offset of the reflective optic, as described above.

As further shown in FIG. 4, process 400 may include determining a characteristic of the optical beam based on directing the optical beam through the dispersion element for the plurality of passes (block 430). For example, the optical device may determine a characteristic of the optical beam based on directing the optical beam through the dispersion element for the plurality of passes, as described above.

Process 400 may include additional implementations, such as any single implementation or any combination of implementations described below and/or in connection with one or more other processes described elsewhere herein.

In a first implementation, directing the optical beam through the dispersion element comprises directing the optical beam through the dispersion element on a first pass of the plurality of passes, reflecting the optical beam with the fixed perpendicular offset using the reflective optic based on directing the optical beam through the dispersion element on the first pass, and directing the optical beam through the dispersion element on a second pass, of the plurality of passes, based on reflecting the optical beam with the fixed perpendicular offset. In some implementations, beam offsets in a perpendicular direction cancel on successive reflections.

In a second implementation, alone or in combination with the first implementation, the reflective optic includes a plurality of component reflective optics corresponding to the plurality of passes.

In a third implementation, alone or in combination with one or more of the first and second implementations, directing the optical beam through the dispersion element comprises reflecting the optical beam with the fixed perpendicular offset using a first component reflective optic, of the plurality of component reflective optics, for a first pass of the plurality of passes, and reflecting the optical beam with the fixed perpendicular offset using a second component reflective optic, of the plurality of component reflective optics, for a second pass of the plurality of passes.

In a fourth implementation, alone or in combination with one or more of the first through third implementations, directing the optical beam through the dispersion element comprises inverting a spectrum of the optical beam for a second pass, of the plurality of passes, through the dispersion element relative to the optical beam for a first pass of the plurality of passes.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical device, comprising:
   a dispersion element;
   a reflective optic to reflect an optical beam with a fixed offset perpendicular to a dispersion direction of the dispersion element and with a negative offset in the dispersion direction of the dispersion element,
      wherein the reflective optic is aligned to the dispersion element to offset an optical beam with respect to the dispersion element and to cause the optical beam to pass through the dispersion element on a plurality of passes, offsetting the optical beam on each of the plurality of passes; and
   a reflective tuning element in an optical path of the dispersion element and the reflective optic.

2. The optical device of claim 1, wherein the negative offset in the dispersion direction is configured to cause a spectral inversion.

3. The optical device of claim 1, wherein the optical device is at least one of an optical channel monitor or a spectrometer.

4. The optical device of claim 1, wherein the dispersion element comprises a diffraction grating.

5. The optical device of claim 1, wherein the reflective tuning element is a microelectromechanical system tilting mirror.

6. The optical device of claim 1, wherein the reflective optic comprises a reflective prism.

7. The optical device of claim 1, wherein the reflective optic comprises a plurality of reflective prisms.

8. The optical device of claim 1, wherein the reflective optic comprises a prism with refractive faces.

9. The optical device of claim 1, further comprising:
   a lens in an optical path of the dispersion element and the reflective optic.

10. The optical device of claim 1, wherein the reflective optic is configured to cause beam offsets in a perpendicular direction to cancel on successive reflections of the reflective optic.

11. A method, comprising:
    receiving, at an input port of an optical channel monitor, an optical beam;
    directing, by a reflective optic of the optical channel monitor, the optical beam through a dispersion element of the optical channel monitor and a reflective tuning element of the optical channel monitor for a plurality of passes, wherein each pass is offset in accordance with a fixed perpendicular offset of the reflective optic; and
    determining, by the optical channel monitor, a characteristic of the optical beam based on directing the optical beam through the dispersion element for the plurality of passes.

12. The method of claim 11, wherein directing the optical beam through the dispersion element and the reflective tuning element comprises:
    directing the optical beam through the dispersion element and the reflective tuning element on a first pass of the plurality of passes;
    reflecting the optical beam with the fixed perpendicular offset using the reflective optic based on directing the optical beam through the dispersion element and the reflective tuning element on the first pass; and
    directing the optical beam through the dispersion element and the reflective tuning element on a second pass, of the plurality of passes, based on reflecting the optical beam with the fixed perpendicular offset.

13. The method of claim 11, wherein the reflective optic comprises a plurality of component reflective optics corresponding to the plurality of passes.

14. The method of claim 13, wherein directing the optical beam through the dispersion element and the reflective tuning element comprises:

reflecting the optical beam with the fixed perpendicular offset using a first component reflective optic, of the plurality of component reflective optics, for a first pass of the plurality of passes; and reflecting the optical beam with the fixed perpendicular offset using a second component reflective optic, of the plurality of component reflective optics, for a second pass of the plurality of passes.

15. The method of claim 11, wherein directing the optical beam through the dispersion element and the reflective tuning element comprises:

inverting a spectrum of the optical beam for a second pass, of the plurality of passes, through the dispersion element and the reflective tuning element relative to the optical beam for a first pass of the plurality of passes.

16. The method of claim 11, wherein the reflective tuning element is a microelectromechanical system mirror.

17. A reflective optic, comprising:
a plurality of prism faces,
    wherein the plurality of prism faces are angled with respect to each other to cause, in an optical path, a fixed perpendicular offset in at least one optical path through the reflective optic with respect to at least one other optical path through the reflective optic,
    wherein a size of the fixed perpendicular offset is independent of an incident position of an optical beam on a prism face of the plurality of prism faces, and
    wherein the plurality of prism faces are angled with respect to each other to cause, in the at least one optical path, a spectral inversion.

18. The reflective optic of claim 17, wherein the at least one optical path through the reflective optic comprises at least one internal reflection within the reflective optic.

19. The reflective optic of claim 17, wherein the plurality of prism faces are formed from at least one of a glass material, a plastic material, or a semiconductor material.

20. The reflective optic of claim 17, wherein the at least one optical path comprises a plurality of optical paths alignable to a plurality of positions on a dispersion element.

* * * * *